PORTABLE CALL-SIGNAL RECEIVER WITH POWER SAVING MEANS
Filed Sept. 21, 1961
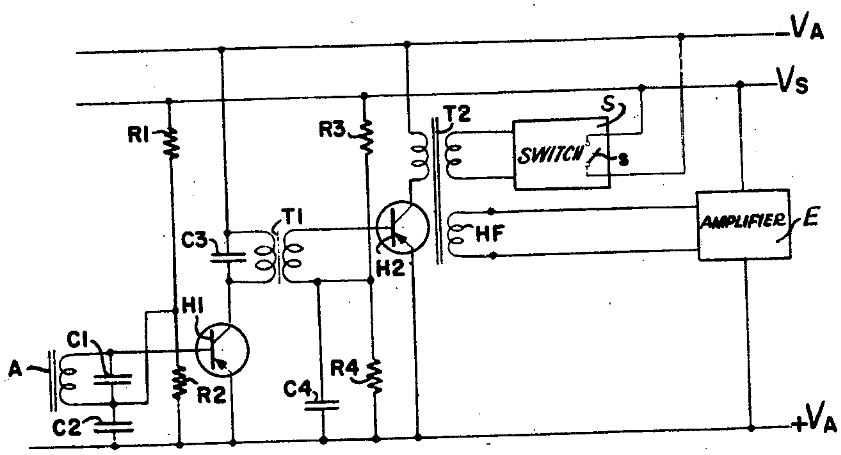

United States Patent Office
3,142,801
Patented July 28, 1964

3,142,801
PORTABLE CALL-SIGNAL RECEIVER WITH POWER SAVING MEANS

Heinrich König, Rothenfluh, near Oberembrach, Zurich, and Gottfried Tschannen, Zurich, Switzerland, assignors to Albiswerk Zurich A.G., Zurich, Switzerland, a corporation of Switzerland
Filed Sept. 21, 1961, Ser. No. 139,698
6 Claims. (Cl. 325—492)

Our invention relates to portable electronic receivers which are equipped with a transistor amplifier for a call signal, and preferably to call-signal receivers of the self-energized type.

Self-energized appliances, obtaining the necessary current from batteries rather than from a utility line, should consume as little current as possible. This current consumption greatly affects the periods of time during which no maintenance or battery exchange is required. Many such appliances operate during distinct working periods and ready periods, for example receivers for call and signalling systems, remote metering or remote control systems. With such apparatuses, the ready periods are much longer than the working periods, so that the ready period largely determines the required capacity of the battery. Conversely, a given capacity or size of the battery and the current consumption of the apparatus jointly determine the maintenance-free period of time for the particular apparatus. Increasing employment of transistors greatly reduces the current consumption in many cases. The miniaturization also afforded by transistors resulted in a reduction as to size and weight of the batteries.

Presently, devices are known which reduce total current consumption by means of built-in switches which disconnect the current supply for short-time intervals during the ready period of the apparatus. Other economy expedients result in circuits wherein only the pre-stages are continuously switched on. In such devices the incoming signal releases a switch which applies the current supply to the other amplifier stages as well as the ultimate working members of the apparatus either for the duration of the signal or for an adjustable period of time. This affords greatly reducing the current consumption and correspondingly increasing the maintenance-free time period. However, the obtainable economy depends upon the number of pre-stages which amplify the signal to such an extent that the switch is reliably released.

It is known that electronic tubes and transistors will operate as class-B amplifiers without considerable loss in amplification if the input signal is not too weak, i.e. is at least as great as the B-range. For that reason, any pre-amplifier stages in which the input signal is below the level just defined, must not be subjected to class-B operation because for such minute signals the amplification is zero.

For such reasons, the above-mentioned economy circuits have been limited to the end stages whose operating point is displaced by the signal itself.

It is an object of our invention to devise an economy circuit in a signal amplifier equipped with transistors and comprising pre- and end-stages, for portable call-signal receivers particularly in wireless personnel-locating systems and to afford having the entire receiver switched on, with respect to the battery-energized or other local power supply, by the effect of a signal being received.

To this end, and in accordance with a feature of our invention, we normally energize the pre-amplifier stage of the portable and self-energized receiver from an antenna tuned to the call frequency, while the other amplifier stages, particularly the end stages, are put into operation by connecting them with the power supply with the aid of an electronic switch under control by a call signal amplified in the pre-stage. The same switch also operates to connect the previously signal-energized pre-stage with the power supply. The pre-stage, however, operates in class-B operation prior to and during the switching-in stage and is then transferred to class-A operation simultaneously with the end stage as soon as the latter is rendered operative by the electronic switch.

In a wireless call receiver for locating personnel, the antenna, forming the source of the signal current, constitutes a high-ohmic source feeding the input stage of the pre-amplifier stage. Under such conditions, it is possible with a transistor, as contrasted with an electronic tube, to let transistor perform in class-B operation in spite of the usual limitation on small signal inputs, without appreciably reducing the amplification in comparison with class-A operation. Depending upon the operating condition, only one half-wave may then be amplified, namely the negative half-wave when the transistor is of the P–N–P type.

The invention will be further described with reference to the drawing showing a schematic circuit diagram of a call-signal receiver for a wireless personnel-locating system.

The calls are effected by series of coded pulses at a transmission frequency above the audible low-frequency range. The receiver in the drawing has a two-stage pre-amplifier with respective transistors H1 and H2 in common-emitter connection. Connected with the pre-amplifier is an electronic switch S which may also consist of a transistor circuit such as shown in the copending application of Alois Koller and Gottfried Tschannen, Serial No. 111,554, filed May 24, 1961, and assigned to the assignee of the present application. The electronic switch S is shown only schematically, and when closed applies A-battery voltage $V_A$ to the end stages shown schematically at E, of the receiver. The inductive antenna A forms part of a tank circuit which comprises a capacitor C1 and is tuned to the call frequency. The tank circuit is connected with the base of the transistor H1. The emitter of transistor H1 is connected to the positive battery lead. Connected in the collector circuit of transistor H1 is a capacitor C3 which forms a collector tank circuit together with a transformer T1. Bias potential for the base of transistor H1 is supplied by means of a voltage divider composed of two resistors R1 and R2 which are connected in series between the positive battery lead and a lead $V_s$. The secondary of transformer T1 is connected to the base of transistor H2. Bias potential for this base is provided from another voltage divider composed of resistors R3 and R4 which are connected parallel to voltage divider R1–R2. The base circuits of the two transistors are decoupled from the positive battery lead $+V_A$ by means of respective capacitor C2 and C4. Consequently, the voltage of lead $V_s$ is normally zero.

The possibility of class-B operation with low voltage signals is based upon the fact that the transistor H1 is a current amplifier and further that the current in the load resistance of a high-ohmic voltage source is substantially independent, within wide limits, from the magnitude of the load resistance. In other words, when the resistance of the load increases, the voltage at the resistance increases to such an extent that the current maintains a constant value.

These requirements of a high-ohmic voltage source are indeed satisfied by an antenna which is tuned with a parallel-resonance circuit provided the quality factor (Q) of the antenna circuit is considerably higher than its quality factor when the circuit is subject to damping (attenuation) by the input-stage transistor after the latter is switched over to class-A operation. Such a low quality factor, however, is a prerequisite for proper processing of an impulse program as constituted by a sequence of code pulses which constitute each signal, because these pulses possess a broad spectrum in the vicinity of a carrier frequency due to the steep ascent and descent at the pulse edges.

In the drawing, when a call signal, consisting of a pre-pulse and the sequence of selector pulses proper, is being received, the transistors H1 and H2 of the high-frequency pre-amplifier operate in B-operation. Their input impedance is high so that the antenna and the tank circuits are subjected to weak damping. Consequently, a voltage increase takes place in accordance with the high quality factor of these tank circuits. A tuned inductive antenna behaves like a parallel-resonance circuit. That is, it furnishes a constant current which is proportional to the magnetic flux. When the loss resistances of the antenna and of the tank circuit are higher than of the parallel connected input resistance of the transistors in class-B operation, then virtually the entire current flows into the transistors. This current is amplified by the transistors and thus is applied through the transformer T2 to the electronic switch S which becomes closed. The switch S then connects the other stages of the receiver E across the battery leads, and the transistors H1 and H2 of the high-frequency amplifier are now transferred to class-A operation because the voltage dividers R1–R2 and R3–R4 are now energized and apply the proper bias potential to the respective transistors H1 and H2. The transistors now assume a low resistance and impose a high damping upon the tank circuits so that the respective quality factors are greatly reduced. This is necessary for transmitting the selector pulses without appreciable distortion in wave shape.

It is assumed in the foregoing that the illustrated embodiment operates in response to call signals corresponding to given pulse programs so that each of a multiplicity of receivers will respond to one of a corresponding number of different pulse sequences. However, the same receiver is also suitable for operation in accordance with a frequency-selective call performance, it being only necessary to tune the antenna to the frequency of the first selector pulse. In the following class-A operation, the antenna will then operate with a greatly reduced selectivity so that the band width suffices also for the frequencies of the other selector pulses.

Receivers according to the invention are not limited for use with high-frequency amplifiers but are analogously applicable for low-frequency amplifiers. In this case, however, distortion may have to be taken into account up to the moment the receiver is transferred to class-A operation, such distortions being due to half-wave rectification during the initial class-B operation.

Such and other modifications with respect to circuitry, components and particular use of the invention will be obvious to those skilled in the art, upon a study of this disclosure, and are indicative of the fact that the invention can be given embodiments other than particularly illustrated and described herein, without departing from the essential features of our invention and within the scope of the claims annexed hereto.

We claim:

1. A portable call-signal receiver, comprising a transistor pre-stage and an end-stage, an antenna tuned to the call frequency for energizing said pre-stage, a switch controlled by the call-signal amplified in the pre-stage and connected to said end-stage to place it in operation, said pre-stage including means responsive to switching of said switch for maintaining other than class-A amplifier operation in said pre-stage prior to and during the switching of said switch and for transferring said pre-stage to class-A operation simultaneously with placing the end-stage into operative condition, said pre-stage presenting to said antenna a higher input impedance during the other than class-A operation and a low input impedance during class-A operation.

2. In a portable call-signal receiver for wireless personnel-locating systems, a signal amplifier, comprising a pre-stage and an end-stage, an antenna tuned to the call frequency for energizing said pre-stage, a switch controlled by the call-signal amplified in the pre-stage and connected to said end-stage to place it in operation, said pre-stage including a transistor having a base and an emitter and a collector in grounded emitter connection, biasing means in said pre-stage for maintaining a direct-current zero volt bias level on said base relative to said emitter so as to achieve class-B operation in said pre-stage prior and during the switching of said switch, said biasing means being connected to said switch to change the direct current bias level on said base relative to said emitter so as to produce class-A operation in said pre-stage in response to switching of said switch.

3. In a portable call-signal receiver for wireless personnel-locating systems, a signal amplifier, comprising a pre-stage and an end-stage, an antenna tuned to the call frequency for energizing said pre-stage, a switch controlled by the pre-stage-amplified call-signal and connected to said end-stage to place it in operation, said pre-stage including a transistor having a base and an emitter and a collector in common-emitter connection, a bus connected to said switch and to said end-stage and adapted to be energized when said switch closes so as to form the voltage line from which said end-stage is placed in operation, circuit means connecting said base to said bus to effect class-A amplifier operation of said transistor when said switch closes, means to effect class-B operation of said transistor prior and during operation of said switch, whereby said pre-stage operates in class-B operation before said end-stage is placed in operation and in class-A operation after said end-stage is placed in operation.

4. In a portable call-signal receiver for wireless personnel-locating systems, a signal amplifier, comprising a pre-stage and an end-stage, an antenna tuned to the call frequency for energizing said pre-stage, a switch controlled by the call-signal amplified in the pre-stage and connected to said end-stage to place it in operation, said pre-stage including two transistors each having a base and an emitter and a collector in common-emitter amplifier connection, a capacitor in said pre-stage connected to said antenna to form a tank circuit therewith and connected to the base of one of said transistors, a second tank circuit forming a load for said one transistor and coupling said transistor to the base of the other transistor, capacitor means connecting each tank circuit to the common emitters of each transistor, biasing means in said pre-stage for maintaining class-B amplifier operation in said pre-stage prior to and during the switching of said switch, said biasing means being connected to said switch to receive electrical energy from said end-stage and to place said pre-stage to class-A operation simultaneously with placing the end-stage into operative condition.

5. In a portable call-signal receiver for wireless personnel-locating systems, a signal amplifier, comprising a pre-stage and an end-stage, an antenna tuned to the call frequency for energizing said pre-stage, a switch controlled by the pre-stage-amplified call-signal and connected to said end-stage to place it in operation, said pre-stage including two transistors each having a base and an emitter and a collector in common-emitter amplifier connection, a capacitor in said pre-stage connected to said antenna to form a tank circuit therewith and connected to the base of one of said transistors, a second tank circuit forming a load for said one transistor and coupling said transistor to the base of the other transistor, capacitor means connecting each tank circuit to the common emitters of each transistor, base biasing means in said pre-stage, and a bus adapted to be energized when said switch is closed and connected to said end-stage to form a voltage supply lead when said switch is closed, said base biasing means in said pre-stage including a pair of voltage dividers connected across said bus and the emitters of said transistors and having mid-points connected to said respective tank circuits.

6. A call-signal receiver comprising voltage source means, pre-amplifier means energized by said voltage source means, antenna means tuned to the call frequency and connected to the pre-amplifier for energizing it, amplifier means connected to said pre-amplifier means for amplifying its output signals, switch means responsive to call signals from said pre-amplifier means for connecting said voltage source means to said pre-amplifier means so as to energize it, said pre-amplifier means having peaking means responsive to said switch means for high-Q tuning said antenna means before response of said switch means to call signals and for reducing the Q of the antenna after response of said switch means to said call signals.

References Cited in the file of this patent

UNITED STATES PATENTS

| | | |
|---|---|---|
| 1,804,526 | Coxhead | May 12, 1931 |
| 1,962,611 | Nyman | June 12, 1934 |
| 2,047,900 | Bruckel | July 14, 1936 |
| 2,912,574 | Gensel | Nov. 10, 1959 |